(12) United States Patent
Dana (10) Patent No.: US 8,298,696 B1
(45) Date of Patent: Oct. 30, 2012

(54) BATTERY SYSTEMS AND METHODS THEREOF

(76) Inventor: Eddie Dana, Brooklyn, NY (US)

( * ) Notice: Subject to any disclaimer, the term of this patent is extended or adjusted under 35 U.S.C. 154(b) by 1116 days.

(21) Appl. No.: 12/131,970

(22) Filed: Jun. 3, 2008

(51) Int. Cl.
 *H01M 2/36* (2006.01)
 *H01M 2/10* (2006.01)
 *B65D 85/00* (2006.01)

(52) U.S. Cl. ............ 429/99; 429/96; 429/100; 206/703

(58) Field of Classification Search ................... 429/96, 429/100, 99; 206/703
See application file for complete search history.

(56) References Cited

U.S. PATENT DOCUMENTS

| | | |
|---|---|---|
| 3,301,712 A | 1/1967 | Bach |
| 3,542,603 A | 11/1970 | Simon |
| 3,990,919 A | 11/1976 | Krueger |
| 4,037,026 A | 7/1977 | Mabuchi |
| 4,153,758 A | 5/1979 | Cerny |
| 4,205,121 A | 5/1980 | Naitoh |
| 4,431,717 A | 2/1984 | Kikuchi |
| 4,718,742 A | 1/1988 | Utoh et al. |
| 4,767,358 A | 8/1988 | Nullmeyer et al. |
| 4,842,966 A | 6/1989 | Omori et al. |
| 5,015,546 A | 5/1991 | Dulaney et al. |
| 5,061,579 A | 10/1991 | Ishimoto |
| 5,071,716 A | 12/1991 | Petzl et al. |
| 5,242,767 A | 9/1993 | Roback et al. |
| 5,296,315 A * | 3/1994 | Rein .......................... 429/100 |
| 5,316,873 A | 5/1994 | Scrivano |
| 5,395,263 A | 3/1995 | Sandell |
| 5,670,267 A * | 9/1997 | Lee ................................. 429/9 |
| 5,686,811 A | 11/1997 | Bushong et al. |
| 5,733,674 A | 3/1998 | Law et al. |
| 5,736,271 A * | 4/1998 | Cisar et al. ................ 429/96 |
| 5,744,930 A | 4/1998 | Fleming et al. |
| 5,851,691 A | 12/1998 | Palmer et al. |
| 5,872,831 A | 2/1999 | Zoiss et al. |
| 5,933,496 A | 8/1999 | McKinnon |
| 6,060,193 A | 5/2000 | Remes et al. |
| 6,071,639 A | 6/2000 | Bryant et al. |
| 6,119,864 A | 9/2000 | Kessler et al. |
| 6,228,517 B1 | 5/2001 | Chih-Chang et al. |
| 6,228,528 B1 | 5/2001 | Burkholder et al. |
| 6,274,266 B1 | 8/2001 | Wang |
| 6,291,095 B1 | 9/2001 | Griffey et al. |
| 6,460,947 B1 | 10/2002 | Wah |
| 6,461,763 B1 | 10/2002 | Witzigreuter et al. |
| 6,507,170 B2 | 1/2003 | O'Neill et al. |
| 6,531,244 B1 | 3/2003 | Ryan, Jr. et al. |
| 6,600,291 B2 | 7/2003 | Pautet et al. |
| 6,677,078 B2 | 1/2004 | Reise et al. |

(Continued)

*Primary Examiner* — Patrick Ryan
*Assistant Examiner* — Julian Anthony
(74) *Attorney, Agent, or Firm* — Connie R. Masters (57) ABSTRACT

Battery systems and kits are disclosed and provide improved merchandizing opportunities. Battery systems comprise an adaptor including a recess having one or more walls and a base located in a portion of the adaptor. One or more batteries may be received by the recess. The batteries may include one or more battery contacts and may be sized to a depth substantially equivalent to a depth of the walls of the recess. At least one of the walls may include one or more first electrical contacts corresponding to the battery contacts. A portion of the adaptor may have one or more second electrical contacts corresponding to one or more electrical contacts of a portable electronic device or circuit board. The first electrical contacts are in communication with one or more of the second electrical contacts. These battery systems replace one or more dedicated battery systems associated with a portable electronic device.

15 Claims, 7 Drawing Sheets

U.S. PATENT DOCUMENTS

| | | |
|---|---|---|
| 6,695,777 B2 | 2/2004 | Solomon et al. |
| 6,710,576 B1 | 3/2004 | Kaufman et al. |
| 6,727,677 B1 | 4/2004 | Bouskila |
| 6,921,142 B2 | 7/2005 | Wah |
| 6,955,863 B2 | 10/2005 | Bean et al. |
| 6,986,424 B1 * | 1/2006 | Morrison .............. 206/703 |
| 7,146,198 B2 | 12/2006 | Yu et al. |
| 7,150,637 B2 | 12/2006 | Ohmori et al. |
| 7,183,014 B2 | 2/2007 | Sasaki et al. |
| 7,183,743 B2 | 2/2007 | Geiger |
| 2002/0086647 A1 | 7/2002 | Ilvonen |
| 2003/0082441 A1 | 5/2003 | Hovi et al. |

* cited by examiner

Fig. 1A

Prior Art

Prior Art

BATTERY SYSTEMS AND METHODS THEREOF

FIELD OF THE INVENTION

This invention generally relates to batteries and, more specifically, to battery systems for portable electronic devices wherein the battery systems vary from one device to another, and to a merchandising method for such battery systems.

BACKGROUND OF THE INVENTION

Manufacturers of portable electronic devices such as digital assistants, mobile (or cell) telephones, handheld telephones, laptop computers and the like have assigned a low priority to the design of battery systems. Consumer involvement with battery systems is low, and competition in the portable electronic device market is fierce. Together, these factors result in more emphasis being given to providing top-level functionality and attractive, overall device design. Moreover, the trend is to ever-increasing miniaturization of portable electronic devices. All of these factors combine to make the design of battery systems a back-end process. The shape of battery compartments is essentially whatever space is left over after accounting for the space needed by top-level functions and the demands of attractive, overall device design.

Because battery systems design is a back-end process, portable electronic devices lack uniform or compatible battery systems. In particular, most devices require dedicated batteries, i.e., batteries manufactured to fit and work with just one type and brand of portable electronic device. Throughout this disclosure, the term "dedicated battery" connotes the custom-manufactured battery or set of batteries intended by the manufacturer to be used in a particular portable electronic device.

The need for dedicated batteries poses several disadvantages to retailers and consumers to the extent batteries need to be replaced. In this connection, it should be noted that even rechargeable batteries have limited lives, because they depend on the use of chemicals that become spent after a certain number of recharge cycles.

First, the need for dedicated batteries means that retailers must stock and display different batteries for virtually every portable electronic device they carry. This can amount to dozens of different battery types needing to be stocked and displayed. The following example illustrates this: A retailer has fifteen regional outlets; each outlet carries four dozen different portable electronic devices; each device requires stock of dedicated replacement batteries; appropriate stock consists of five units per store. To accommodate these needs, the retailer must have inventory of 3,600 replacement batteries. Failing this, the retailer risks customer disappointment by being out of stock on replacement batteries, possibly causing customers to go elsewhere for replacement batteries and, worse, possibly losing more important purchases customers may have made had they stayed at the store, as well as customer good will. On the other hand, stocking such a large quantity of replacement batteries means not only an increased carrying cost of inventory, but also substantially increased exposure to the risk of unsold inventory. In the fast-changing portable electronic device market, where products rapidly become obsolete, this risk is especially great. As far as display is concerned, the disadvantage to retailers is even worse. Shelf space is an extremely valuable resource to retailers. Needing to display dozens of replacement battery SKUs is an appallingly bad use of retail shelf space.

Second, consumers dislike the confusion engendered by the lack of uniformity and compatibility of replacement batteries for portable electronic devices. Finding the right replacement battery for the right portable electronic device is a chore, because these items are not inherently interesting to consumers except insofar as they enable their devices to work. Since the replacement batteries lack distinctive features readily noticeable to consumers, in order to find the right replacement battery, consumers must match battery replacements to model numbers that, too, are invariably in formats lacking inherent distinctiveness or interest to consumers, e.g., "MOTOROLA T300p®" "Try Me"-type packaging, enabling consumers to plug an accessory into his or her device to check for compatibility without purchasing the accessory or breaking the seal of its packaging, is helpful, but (a) it is not really applicable to replacement batteries, and (b) it is relatively expensive and more difficult to maintain for proper shelf discipline and appearance. To the extent consumers rely on sales help to guide them through the maze of replacement battery types, this represents a drain on retailer resources (resulting in higher prices to consumers), as well as resources diverted from the sale of items leading to greater production of revenue.

Third, for all of the reasons listed above, consumers are more likely to err in the purchase of replacement batteries than other products. This results in customer disappointment and inconvenience. To the extent retailers make good these inevitable consumer mistakes, retailers must absorb increased packaging and labor costs to process returns.

Most of the foregoing is also true for Internet retailers and consumers. Though carrying cost and exposure to unsold inventory may be less for Internet retailers than their brick-and-mortar counterparts, consumers have limited patience to scan Web "shelf space," meaning that a great advantage is to be gained by conserving it for primary goods as opposed to replacement batteries. Regarding opportunity for erroneous purchases, it is equal or greater on the Internet, where sales help is largely absent. Moreover, the cost of processing returns, as well as delay in customer satisfaction, are both greater on the Internet.

A number of different disclosures reveal strategies for providing claimed universal battery systems. However, these disclosures fall short of solving the foregoing problems.

For example, Law et al., U.S. Pat. No. 5,733,674, disclosed a power supply system allowing a user to standardize one or two battery types, and to use these supported types to power portable electronic devices designed to use other, non-supported battery types. However, Law et al. primarily sought to overcome the problem that, due to the lack of uniformity and compatibility among replacement batteries for portable electronic devices, power is likely to be unavailable when needed upon failure of the dedicated battery. Law et al. thus focused on a battery system able to use standard batteries, i.e., AAA, AA, A, B, C, D, 6-volt, 9-volt and 12-volt batteries, that are widely available wherever and whenever the dedicated battery fails. At the time of Law et al.'s disclosure, small, powerful batteries such as Lithium-ion and Lithium-polymer batteries with a voltage rating of 3.6 to 3.7 volts were unavailable. Consequently, Law et al. revealed a complicated, cumbersome battery pack configured to accommodate relatively large batteries. More to the point, Law et al. revealed a battery pack that changes the look and feel of a portable electronic device, rather than just replace the batteries of the device. This is understandable, given the disclosure's emphasis on immediate availability of power after battery failure. However, it does not represent a viable market solution to the problems set forth above, since retailers and consumers are unlikely to accept compromise to the look and feel of portable electronic devices in order to accommodate a bulky, cumbersome alternative battery pack.

As will be discussed below in the Description of the Invention, many other prior art references also describe attempts to supply "universal batteries" or "adaptors using an external add-on" or "adaptors that can be extended to fit into a specific battery compartment". However, to the extent these disclosures consist of specially designed, adaptable battery compartments for portable electronic devices, such solutions are manufacturer-based, not retailer-based or consumer-based. They do not solve the predominant situation where manufacturers give lowest design priority to battery compartments, and simply fail to provide standard or adaptable battery compartments. To the extent these disclosures comprise means to adapt standard batteries, they either comprise means to adapt standard batteries into other standard batteries (e.g., turning a AAA battery into a AA battery), or unacceptably change the look and feel of the portable electronic device.

SUMMARY OF THE INVENTION

The current disclosure is directed to replacement battery systems using shell assemblies/adaptors mimicking the dedicated battery of a portable electronic device. Such replacement battery systems are configured to receive one or more smaller-sized batteries fitting into one or more shell assemblies/adaptors in order to provide retailers and consumers with a more cost-effective and convenient way to sell and buy replacement batteries for portable electronic devices.

For example, in an embodiment of the invention, a single merchandising package may comprise a small Lithium-ion or Lithium-polymer battery adapted to power a broad set of portable electronic devices. The package also may comprise a set of inexpensive shell assemblies/adaptors, each of which may be configured to accept the battery, and each one of which may mimic the look, feel and function of the dedicated battery system of a different portable electronic device. As described herein, "look and feel" refers here to the shape of the dedicated battery and, to the extent the dedicated battery acted as an exterior surface of the device to which it was dedicated, its finish. "Function" refers here to enabling the battery and shell assembly/adaptor combination to operate or be used in a manner altogether equivalent to the dedicated battery of a selected portable electronic device. This may be accomplished by providing the shell assembly/adaptor with circuitry connecting the battery to a contact point or points on the outside of the shell assembly/adaptor equivalent to the point or points where the dedicated battery it mimics made contact with its dedicated, portable electronic device or PC board.

The shell assemblies/adaptors are very low cost, so that all but the one shell assembly/adaptor needed for a selected portable electronic device may be readily discarded. Thus, at low cost, a single merchandising package for replacement batteries may be used where, formerly, as many as a dozen different merchandising packages were needed. Given the example above, where a retailer was required to stock 3,600 battery replacement units, instead with the present invention, only 300 units would be needed. Further, where four dozen SKUs were required to be displayed (to the bewilderment of consumers), only four SKUs would be needed.

In accordance with an embodiment of this invention, a battery system is disclosed. The battery system comprises, in combination, an adaptor including a recess having one or more walls and a base, the recess being located in a portion of the adaptor. One or more batteries may be selectively receivable into the recess. The one or more batteries may include one or more battery contacts and the one or more batteries may be sized to a depth substantially equivalent to a depth of the one or more walls of the at least one recess, wherein a portion of a surface of the one or more batteries is substantially adjacent to a portion of a surface of the adaptor when the one or more batteries are inserted into (or engage) the recess. At least one of the walls may include one or more first electrical contacts corresponding to the one or more battery contacts of the one or more batteries. A portion of the adaptor may have one or more second electrical contacts corresponding to one or more electrical contacts of a portable electronic device or PC board, wherein the electronic portable device is powered when the one or more batteries is received in the recess. The one or more first electrical contacts may be in communication with one or more of the second electronic contacts, wherein the battery system may be adapted to replace one or more dedicated battery systems associated with the portable electronic device.

In another aspect, the battery may further comprise at least one latch mechanism located on a portion of the adaptor. Furthermore, the one or more batteries may comprise, for example, a lithium-ion battery, a lithium polymer battery, or a battery type not yet existing in the art.

According to another embodiment of this invention, an adaptor kit configured for one or more portable electronic devices is disclosed. The adaptor kit may comprise, in combination, one or more adaptors, each of the adaptors having a recess located in a portion of each of the adaptors. The recess may have one or more walls and a base. The one or more walls may be sized to a depth to selectively receive one or more batteries, wherein a portion of a surface of the one or more batteries is substantially adjacent to a portion of a surface of the adaptor when the one or more batteries engage the recess. At least one of the walls may include one or more first electrical contacts corresponding to one or more battery contacts of the one or more batteries. A portion of the one or more adaptors may have one or more second electrical contacts corresponding to one or more electrical contacts of a portable electronic device or PC board, wherein the electronic portable device is powered when the one or more batteries is received in the recess. The one or more first electronic contacts may be in communication with one or more of the second electrical contacts, wherein the one or more adaptors are adapted to replace one or more dedicated battery systems associated with each of the one or more portable electronic devices. The one or more adaptors may be located in a package suitable for displaying the one or more adaptors.

In another aspect, the kit may further comprise one or more batteries adapted to be received by the recess. The kit may further comprise one or more instructions. Additionally, the package may comprise a see-through plastic to permit facile viewing of the contents of the package.

In accordance with yet another embodiment of the invention, a method of merchandising one or more adaptor kits configured for one or more portable electronic devices is disclosed. The method comprises a number of steps. The adaptor kits may be provided and each of the adaptor kits may include one or more adaptors with each of the adaptors having a recess located in a portion of each of the adaptors. The recess of each of the adaptors may have one or more walls and a base with one or more walls sized to a depth to selectively receive one or more batteries, wherein a portion of a surface of the one or more batteries is substantially adjacent to a portion of a surface of its corresponding adaptor when the one or more batteries engage the recess. At least one of the walls may include one or more first electrical contacts corresponding to one or more battery contacts of the one or more batteries. A portion of the adaptor may have one or more second electrical contacts corresponding to one or more electrical contacts of a portable electronic device or PC board, wherein the electronic portable device is powered when the one or more batteries is received in the recess. The one or more first electrical contacts may be in communication with one or more of the second electrical contacts, wherein the one or more adaptors may be adapted to replace one or more dedicated battery systems associated with each of the one or more portable electronic devices. The one or more adaptors may be located in a package suitable for displaying the one or more adaptors. In another step the adaptors may be selected for each one of the adaptor kits as determined by economic desires. In yet another step one or more of the adaptor kits may be distributed to one or more of the following: wholesalers, retailers and consumers.

In other aspects of the method one or more batteries may be added to the adaptor kits. Further, a set of instructions may be added to the adaptor kits. Yet further the adaptor kits may be displayed in a retail setting to minimize the amount of shelf space devoted to batteries for portable electronic devices. Furthermore, one or more of the adaptor kits may be selected by one or more purchasers.

The foregoing and other objects, features, and advantages of the invention will be apparent from the following, more detailed description of the various embodiments of the invention, as illustrated in the accompanying drawings and photographs.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature may be called out in another drawing.

The Figures are numbered and annotated so that one skilled in the art of battery and battery pack systems use and construction, by reference to the Figures, will easily be able to understand the materials and method of construction and will be able to easily assemble the parts to achieve the functionality shown.

In the Summary and Preferred Embodiments above, the Description of the Invention, and the Claims and Abstract below, and in the accompanying drawings, reference may be made to particular features (including method steps) of the invention. It is to be understood that this disclosure includes most possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

The term "comprises" and grammatical equivalents thereof are used herein to mean that other components, ingredients, steps etc. are optionally present. For example, an article "comprising" (or "which comprises") components A, B and C can consist of (i.e., contain only) components A, B and C, or can contain not only components A, B and C but also one or more other components.

Where reference is made herein to a method comprising two or more defined steps, the defined steps may be implemented in any order or simultaneously (except where the context excludes that possibility). Moreover, the method may include one or more other steps that may be implemented before any of the defined steps, between two of the defined steps, or after all the defined steps (except where the context excludes that possibility).

The term "at least" as denoted herein means one or more, while the term a "plurality" means two or more.

The term "or" is used herein as a conjunction used to link alternatives in a series of alternatives. The term "and/or" is used herein as a conjunction meaning that either or both of two options may be valid.

The term "and" is used herein as a conjunction to indicate an additional thing, situation or fact.

When used in the appended claims the term "comprising at least one of A and B" as used herein (depending on the context of the specification) may mean: comprising either one of A or of B (and more), or comprising both of A and of B (and more). As is understood in the patent art, "comprising A" means "A and more," while "comprising B" means "B and more." Thus if A is excluded according to the context of the specification in the phrase "comprising at least one of A and B," then A cannot be part of the "and more" and similarly for B if B is excluded according to the context of the specification.

Within this application the terms "mobile telephone," "cell telephone" and "cellular telephone" as used in common understanding of a wireless sending and receiving device are considered to be equivalent electronic devices.

FIG. 1 depicts a front perspective view of a prior art battery pack for laptop computers according to the disclosure of Wah, U.S. Pat. No. 6,460,947. Wah discloses a battery casing adapted to fit into at least two different receiving bays of different sizes in laptop computers. Wah allegedly solved the problem of different-sized bays by providing an adaptor panel, which may be configured into two different positions, and therefore allow the battery pack to sit tightly in two bays of different sizes. However, Wah does not address the problem of battery packs for laptop computers having differently-shaped, not just differently-sized receiving bays, much less the problem of different battery systems of other portable electronic devices.

Figure 1A:
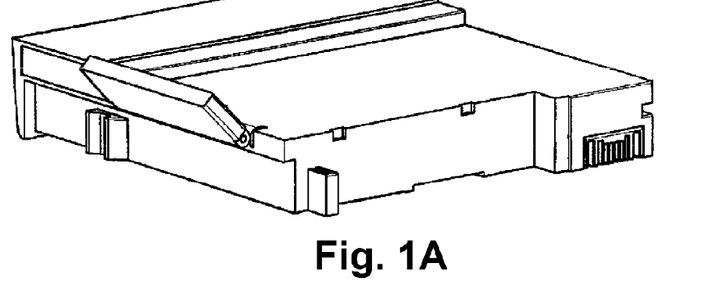
FIG. 1A depicts a front perspective view of a prior art battery pack for laptop computers.
Figure 1B:
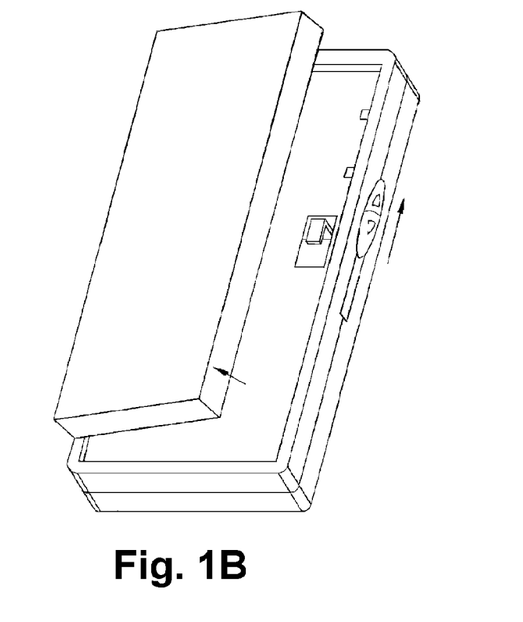
FIG. 1B depicts a front perspective view of a prior art mobile phone/battery arrangement.
Figure 1C:
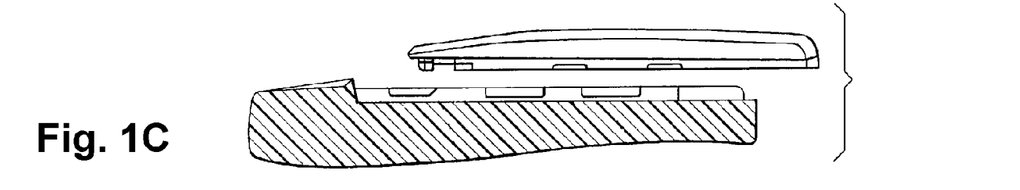
FIG. 1C depicts a side elevation view of another prior art mobile phone/battery arrangement.

FIG. 1B depicts a front perspective view of a prior art mobile phone/battery arrangement according to the disclosure of Yu et al., U.S. Pat. No. 7,146,198. Furthermore, FIG. 1C depicts a side elevation view of another prior art mobile phone/battery arrangement according to the disclosure of Remes et al., U.S. Pat. No. 6,060,193. Both of these disclosures relate to the art of securely attaching and easily removing a battery into a casing of a mobile phone configured to receive a specifically-shaped battery. Thus, neither of these prior art references address the issue of a universal battery for any mobile phone (or indeed any electronic device). Instead, both of these disclosures illustrate the concept of a systems approach to providing new mobile telephones into the market having enhanced, but ultimately different and incompatible features.

Figure 1D:
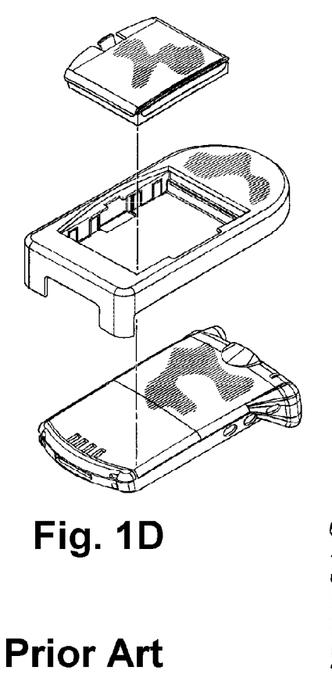
FIG. 1D depicts a front perspective view of a prior art piggyback-style battery adaptor configured for coupling to a portion of a conventional mobile phone battery.

FIG. 1D depicts a front perspective view of a prior art piggyback-style battery adaptor configured for coupling to a portion of a conventional mobile phone battery according to the disclosure of Kaufman et al., U.S. Pat. No. 6,710,576. Kaufman et al. disclose an adaptor that fits on a cellular phone so that a plurality of batteries can be connected in parallel. According to Kaufman et al., the inconvenience of recharging a mobile phone battery and/or changing out a battery, during which time the mobile phone cannot be used as effectively as desired would be diminished if the Kaufman et al. adaptor were made available to consumers.

Figure 1E:
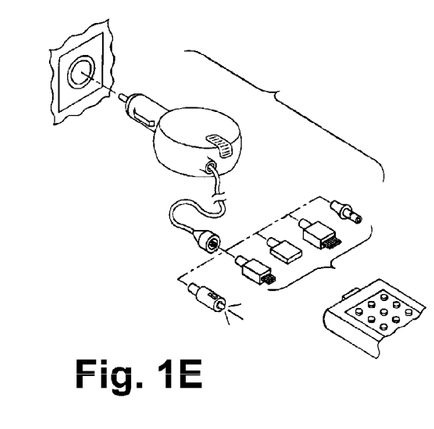
FIG. 1E and FIG. 1F each depict a front perspective view of prior art adaptors configured to attach to conventional mobile phones to recharge on-board batteries.
Figure 1F:
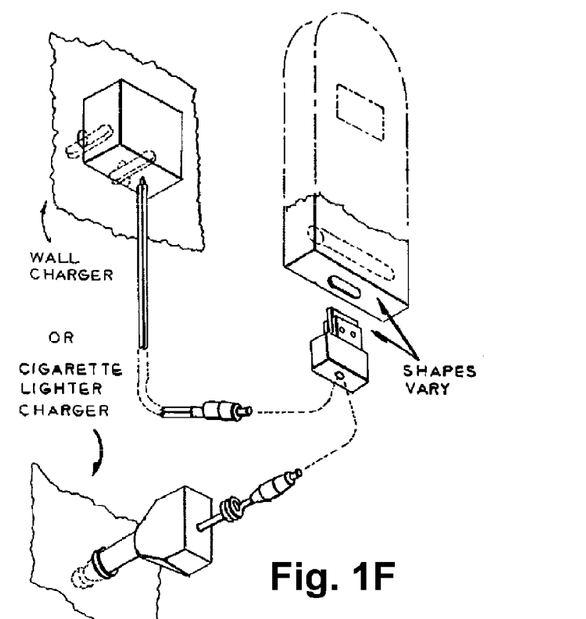

Both FIG. 1E and FIG. 1F depict a front perspective view of prior art adaptors configured to attach to conventional mobile phones to recharge on-board batteries. Thus, FIG. 1E disclosed by Geiger, U.S. Pat. No. 7,183,743 and FIG. 1F disclosed by Bouskila, U.S. Pat. No. 6,727,677 are directed to adaptors. These adaptors relate to charging an on-board battery in a mobile telephone, and attempt to provide universality to the various types of charging systems for batteries used in mobile telephones (or possibly other electronic devices), since these references recognize different chargers may be required for different batteries. However, these prior art references and any similarly directed prior art references that may have been revealed do not read on the disclosure herein, for they are limited to recharging batteries, not replacing them.

Figure 2:
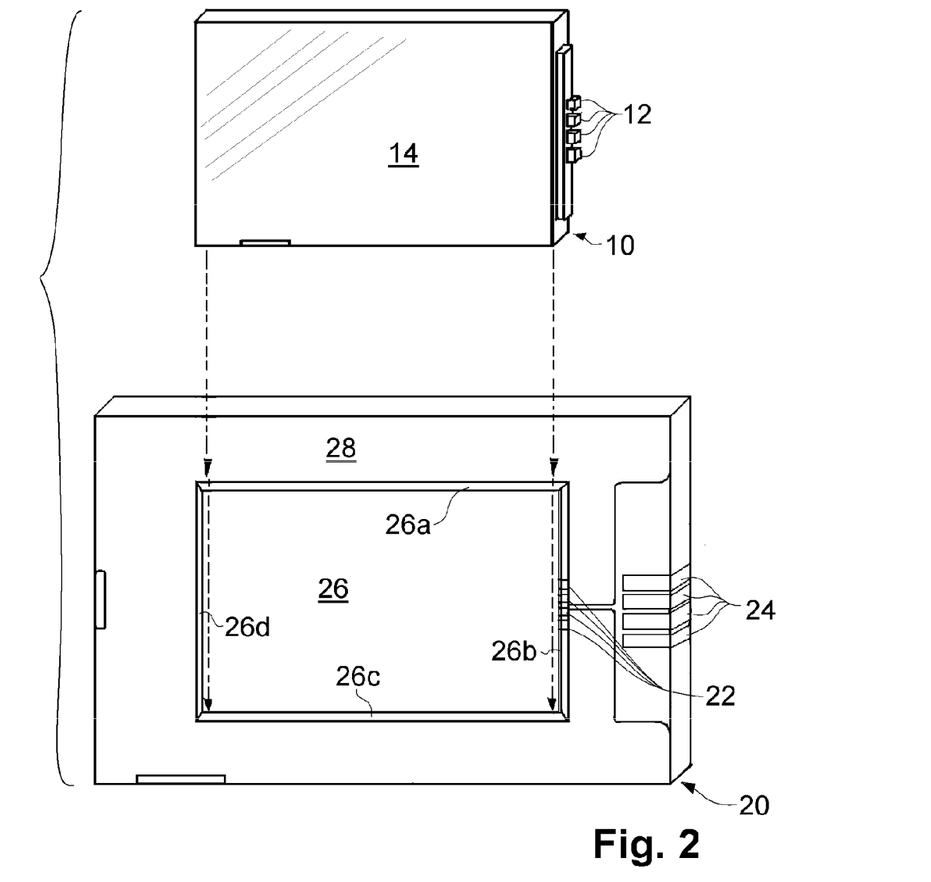
FIG. 2 depicts a front perspective view of a battery system comprising a universal battery and an embodiment of an adaptor according to the invention.

Referring now to FIG. 2, in an exemplary embodiment depicting a mobile phone, a battery system comprises a battery 10 and an adaptor 20 configured to receive the battery. Without limiting the disclosure and only for the purpose of describing salient features, the battery 10 may comprise one or more contacts 12 wherein the contacts may be coupled to one or more circuit boards (not shown) to protect the battery from overheating. Furthermore, the battery 10 may comprise firmware (not shown) located on the circuit boards that may protect the proprietary nature and perhaps quality of the battery from being copied by another manufacturer. In other words, the firmware may comprise software that may be coupled to one or more signal sources that determine whether the battery system may be used with a specific hardware such as a mobile telephone or any other electronic device and the like adapted to accept the battery system.

The battery 10 may further comprise one or more cells (not shown) that provide electrolytic energy to make the battery effective. In most current applications, typically the battery 10 may be recharged with an external recharger (not shown). The elements of the battery 10 described herein may include any type of electrolytic material as is currently known in the art or that may be available in the future. Thus, without limiting the disclosure, in an aspect the battery's electrolytes may be a nickel metal hydride or a lithium ion or lithium polymer formulation as is currently understood, or something else that may be developed in the future art. Conventionally, the cells of a battery may substantially comprise only a single type of electrolytic formulation. However, it should be understood that cells with different electrolytic compositions may also provide adequate electromotive force to be useful as components of the battery 10.

Naturally, since portable electronic devices tend to be small devices—smallness being a generally desirable feature of such devices—the battery 10 must be smaller than the portable electronic device when design considerations require that the battery fit into a portion of the device. In some instances though, the battery 10 may comprise a battery pack, which forms a portion of the portable electronic device, such as a mobile telephone. In this situation, the battery pack may be shaped according to the outer dimensions of the device and the battery pack may be coupled to the mobile telephone. A number of patent disclosures provide special and secure coupling means between the battery pack and a portable electronic device. Such battery packs provide a "proprietary" position for the device manufacturer and therefore provide yet another income source to a portable electronic device manufacturer based on a disposable dedicated battery system.

Furthermore, referring to FIG. 2, besides the above-described battery elements, the battery 10 may comprise an outer casing 14. The outer casing 14 may comprise any material and more often comprises a polymeric material that may bundle inner portions of the battery such as circuit boards, and the battery's cells encased in a metal casing (not shown) that resists the corrosive electrolytic chemicals of the battery's cells. Without limiting the disclosure the outer casing 14 may comprise polymers and/or copolymers such as: polyolefin, polyamide, polyester, polystyrene, polysiloxane, ethylenedicyclopentadiene monomers, CTBN rubbers and the like. Furthermore, the polymeric outer casing 14 may comprise fillers such as carbon black, and other processing additives as is well understood in the art. The outer casing 14 may be manufactured conveniently by injection molding or any other suitable plastics processing procedure, as understood in the art.

According to FIG. 2, the battery system may further comprise an adaptor 20 configured to receive the battery 10. The adaptor 20 may vary in shape according to the type of dedicated battery system being replaced. In an aspect, the adaptor 20 may have an indentation (or recess) configured to receive the battery 10 and may further comprise one or more first contacts 22 located on a portion of a wall 26b of a plurality of walls 26a-26d. The indentation may be defined by one or more adjacent walls 26a-26d and a base 26 sized to receive the battery 10. In an aspect the indentation may comprise one or more elements (not shown) to secure the battery 10 to the adaptor 20. Naturally, the indentation could have any suitable shape to receive any suitable complementary battery. The adaptor 20 may further comprise one or more second contacts 24 located on a portion of the adaptor, wherein the first contacts 22 may be coupled to the second contacts (not shown in FIG. 2, but shown in dotted lines in FIGS. 2A-2G). Of course, the coupling of the one or more first contacts 22 and the one or more second contacts 24 may be mediated by a number of elements such as one or more circuit boards, one or more chips and the like (not shown). Such circuit boards and chips may comprise hardware encoded with one or more programs as discussed above with respect to firmware and proprietary software. The second contacts 24 may interface with yet another set of contacts (not shown) located on a portion of a portable electronic device such as a mobile telephone thereby providing power to drive the mobile telephone's circuitry.

It will be readily appreciated that the geometric appearance of the adaptor 20 may be varied according to the geometrical profile of the portable electronic device and thus would be an integral portion of the portable electronic device. Thus, the battery system comprises the adaptor 20 configured to receive the battery 10. The battery 10 may comprise any suitable battery that provides sufficient electromotive force (such as a 3.6V lithium ion or lithium polymer composition). Of course the battery system may be configured with any suitable battery 10 that would fit into the indentation (or recess) 26 of the adaptor 20. As will be appreciated, the indentation 26 may be substantially defined by the walls 26a, 26b, 26c, 26d and a base portion of the adaptor 20. In an aspect, the depth of the walls 26a, 26b, 26c and 26d may be configured to be substantially equivalent to the depth of the battery 10. Thus, when the battery 10 is installed into the adaptor's indentation 26 and seated between the walls 26a, b, c and d, in one aspect (see FIGS. 2, 2A, 2B, 2C, 2D, 2E, 2F and 2G), a portion of a surface of each adaptor 20, 30, 40, 50, 60, 70 and 80 (see also description below) would be substantially adjacent to a portion of a surface of the outer casing 14 of the battery.

Figure 2A:
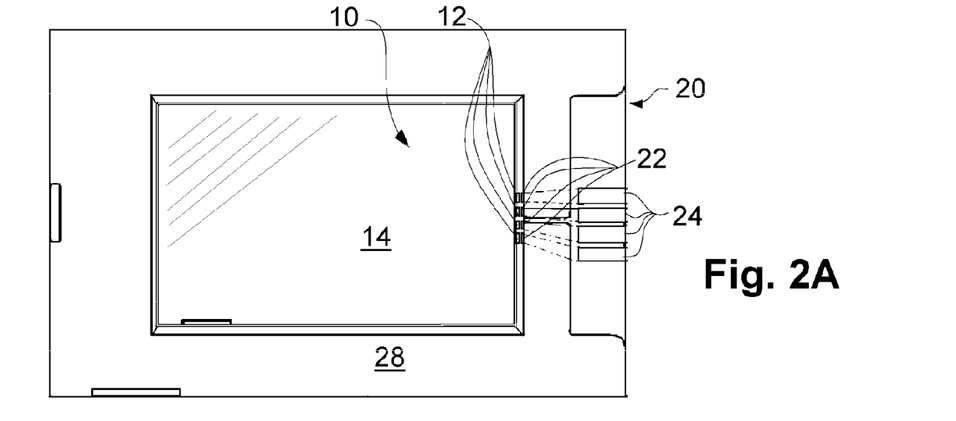
FIG. 2A depicts a plan view of the universal battery of FIG. 2 coupled to the adaptor of FIG. 2.

FIG. 2A depicts a plan view of the battery system comprising the battery 10 of FIG. 2 coupled to the adaptor 20 of FIG. 2. As configured, the battery system of FIG. 2A may replace the dedicated battery of a portable electronic device, which, in this case for purposes of illustration, is the dedicated battery of a mobile telephone. In operation, a user of such a dedicated battery that had become spent after multiple recharges would simply purchase the universal battery 10 along with the adaptor 20, alone or as part of a kit (as described below), whereupon the adaptor 20 retrofits into the mobile phone's battery space and receives the universal battery 10. If purchased as part of a kit (as described below), then the battery system of FIG. 2A presents the significant advantages of retailer and consumer savings and convenience described in detail below. Whether purchased as part of a kit or alone, the battery system of FIG. 2A presents the further advantage of enabling the economic and simple replacement of the battery 10 of the battery system of FIG. 2A itself, once the universal battery 10 becomes spent after multiple recharges. Rather than needing to search out and purchase the dedicated battery of the mobile phone, for example, or even the battery replacement kit described below, a user may simply purchase another universal battery 10 and insert it into the retained adaptor 20, which, in turn, retrofits into the mobile phone's battery space. Naturally, this discussion would be applicable to each embodiment of the battery system as discussed hereunder. Since the universal battery 10 may be economically competitive with an entirely new battery, a consumer benefits and furthermore does not need to hunt for the original battery from multiple retail outlets. Instead, the universal battery 10 would be readily available for purchase, and would be suitable for use in any adaptor 20 capable of receiving the universal battery.

Figure 2B:
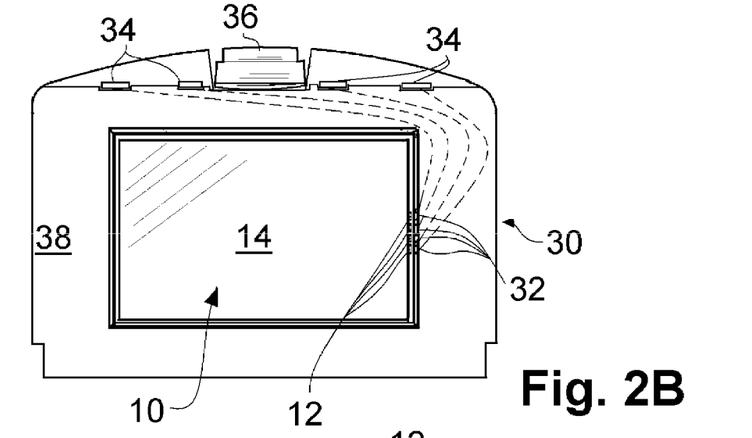
FIG. 2B to FIG. 2G each depict a plan view of a universal battery coupled to each one of other embodiments of adaptors according to the invention.

To further illustrate this concept (and to show below how the adaptors described in this disclosure may be packaged together in a kit for retailer and consumer savings and convenience), referring now to FIG. 2B, a battery system may comprise an adaptor 30 and a universal battery 10 coupled to the adaptor. As illustrated in FIG. 2B, the adaptor 30 comprises a first set of contacts 32 located on a wall of an indentation or recess (not shown, but similar to that described above with respect to FIG. 2). The first set of contacts 32 may electrically couple to the battery's contacts 12 as described above with reference to FIGS. 2 and 2A when the battery is inserted into the recess. Additionally, a portion of the adaptor 30 may comprise one or more second contacts 34 (four shown in FIG. 2B) located on a portion of an end of the adaptor that correspond to one or more contacts of a different portable electronic device (a MOTOROLA STARTAC® mobile telephone). As illustrated in FIG. 2B, and without limiting the disclosure by showing details, each of the first set of contacts 32 may be coupled to one or more of the second contacts 34 (depicted as dotted lines). Further, the adaptor 30 has a different shape compared to the adaptor 20, since the adaptor 30 may be configured to be used in a MOTOROLA STARTAC® mobile telephone. The adaptor 30 further comprises a latch mechanism 36 located on a portion of the end of the adaptor to securely couple the adaptor to a portion of a MOTOROLA STARTAC® mobile telephone (not shown) adapted to receive a corresponding MOTOROLA® dedicated battery having the same shape as the adaptor 30. With the adaptor 30 available and the universal battery 10 available, the battery system of FIG. 2B may replace the dedicated battery of the MOTOROLA STARTAC® mobile telephone. In operation, a user of such a dedicated battery that had become spent after multiple recharges would simply purchase the universal battery 10 along with the adaptor 30, alone or as part of a kit (as described below), whereupon the adaptor 30 retrofits into the mobile phone's battery space and receives the universal battery 10. If purchased as part of a kit (as described below), then the battery system of FIG. 2B presents the significant advantages of retailer and consumer savings and convenience described in detail below. Whether purchased as part of a kit or alone, the battery system of FIG. 2B presents the further advantage of enabling the economic and simple replacement of the battery 10 of the battery system 2B itself, once the universal battery 10 becomes spent after multiple recharges. Rather than needing to search out and purchase the dedicated battery of the MOTOROLA STARTAC® mobile telephone, for example, or even the battery replacement kit described below, a user may simply purchase another universal battery 10 and insert it into the retained adaptor 30, which, in turn, retrofits into the mobile phone's battery space. Naturally, in one aspect, a portion of a surface of the adaptor 30 would be substantially adjacent to a portion of a surface of the outer casing 14 of the battery 10 when the battery was installed into the adaptor's indentation (not shown, but similar to FIGS. 2 and 2A, see description above).

Figure 2C:
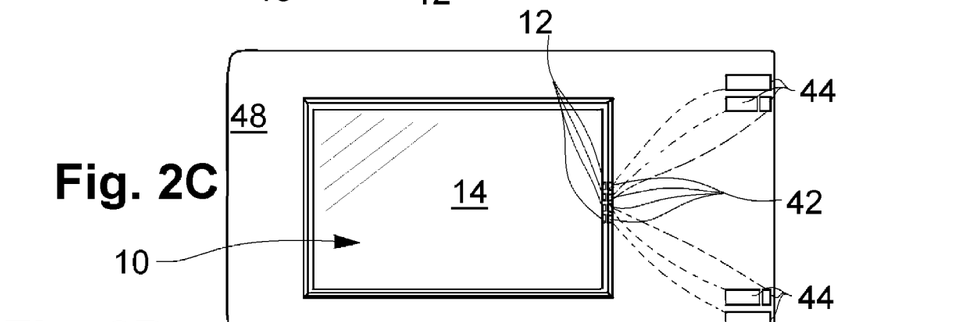

In yet another aspect, referring now to FIG. 2C, a battery system may comprise an adaptor 40 and a universal battery 10 coupled to the adaptor. As illustrated in FIG. 2C, the adaptor 40 comprises a first set of contacts 42 located on a wall of an indentation or recess (not shown, but similar to that described above with respect to FIG. 2). The first set of contacts 42 may electrically couple to the battery's contacts 12 as described above with reference to FIGS. 2 and 2A. Additionally, a portion of the adaptor 40 may comprise one or more second contacts 44 (six shown in FIG. 2C) located on a portion of an end of the adaptor that correspond to one or more contacts of a different portable electronic device (a NOKIA® mobile telephone). As illustrated in FIG. 2C, and without limiting the disclosure by showing details, each of the first set of contacts 42 may be coupled to one or more of the second contacts 44 (depicted as dotted lines). Once again, the adaptor 40 has a different shape compared to the adaptors 20 and 30, since the adaptor 40 may be configured to be used in a NOKIA® mobile telephone. The adaptor 40 further comprises a latch mechanism (not shown) on an opposite side of the adaptor to securely couple the adaptor to a portion of a NOKIA® mobile telephone (not shown) adapted to receive a corresponding NOKIA® battery having the same shape as the adaptor 40. With the adaptor 40 available and the universal battery 10 available, the battery system of FIG. 2C may replace the dedicated battery of the NOKIA® mobile telephone. In operation, a user of such a dedicated battery that had become spent after multiple recharges would simply purchase the universal battery 10 along with the adaptor 40, alone or as part of a kit (as described below), whereupon the adaptor 40 retrofits into the mobile phone's battery space and receives the universal battery 10. If purchased as part of a kit (as described below), then the battery system of FIG. 2C presents the significant advantages of retailer and consumer savings and convenience described in detail below. Whether purchased as part of a kit or alone, the battery system of FIG. 2C presents the further advantage of enabling the economic and simple replacement of the battery 10 of the battery system of FIG. 2C itself, once the universal battery 10 becomes spent after multiple recharges. Rather than needing to search out and purchase the dedicated battery of the NOKIA® mobile telephone, for example, or even the battery replacement kit described below, a user may simply purchase another universal battery 10 and insert it into the retained adaptor 40, which, in turn, retrofits into the mobile phone's battery space. Once again, naturally, in one aspect, a portion of a surface of the adaptor 40 would be substantially adjacent to a portion of a surface of the outer casing 14 of the battery 10 when the battery was installed into the adaptor's indentation (not shown, but similar to FIGS. 2 and 2A, see description above).

Figure 2D:
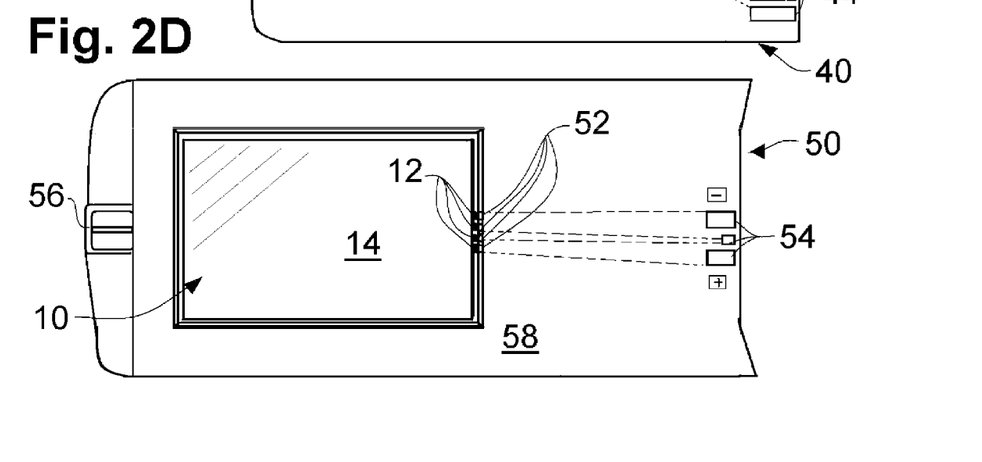

Turning now to FIG. 2D, a battery system may comprise an adaptor 50 and a universal battery 10 coupled to the adaptor. As illustrated in FIG. 2C, the adaptor 50 comprises a first set of contacts 52 located on a wall of an indentation or recess (not shown, but similar to that described above with respect to FIG. 2). The first set of contacts 52 may electrically couple to the battery's contacts 12 as described above with reference to FIGS. 2 and 2A. Additionally, a portion of the adaptor 50 may comprise one or more second contacts 54 (three shown in FIG. 2D) located on a portion of an end of the adaptor 50 that correspond to one or more contacts of yet another portable electronic device (a SAMSUNG® mobile telephone). As illustrated in FIG. 2D, and without limiting the disclosure by showing details, each of the first set of contacts 52 may be coupled to one or more of the second contacts 54 (depicted as dotted lines). Once again, the adaptor 50 has a different shape compared to the adaptors 20, 30 and 40, since the adaptor 50 may be configured to be used in a specific SAMSUNG® mobile telephone. The adaptor 50 further comprises a latch mechanism 56 located on a portion of an opposite end of the adaptor to securely couple the adaptor to a portion of the specific SAMSUNG® mobile telephone (not shown) adapted to receive a corresponding dedicated battery having the same shape as the adaptor 50. However (as described above with respect to adaptors 20, 30 and 40), with the adaptor 50 available and the universal battery 10 available, the battery system of FIG. 2D may replace the dedicated battery of the SAMSUNG® mobile telephone. In operation, a user of such a dedicated battery that had become spent after multiple recharges would simply purchase the universal battery 10 along with the adaptor 50, alone or as part of a kit (as described below), whereupon the adaptor 50 retrofits into the mobile phone's battery space and receives the universal battery 10. If purchased as part of a kit (as described below), then the battery system of FIG. 2D presents the significant advantages of retailer and consumer savings and convenience described in detail below. Whether purchased as part of a kit or alone, the battery system of FIG. 2D presents the further advantage of enabling the economic and simple replacement of the battery 10 of the battery system of FIG. 2D itself, once the universal battery 10 becomes spent after multiple recharges. Rather than needing to search out and purchase the dedicated battery of the SAMSUNG® mobile telephone, for example, or even the battery replacement kit described below, a user may simply purchase another universal battery 10 and insert it into the retained adaptor 50, which, in turn, retrofits into the mobile phone's battery space. Similarly, in one aspect, a portion of a surface of the adaptor 50 would be substantially adjacent to a portion of a surface of the outer casing 14 of the battery 10 when the battery was installed into the adaptor's indentation (not shown, but similar to FIGS. 2 and 2A, see description above).

Figure 2E:
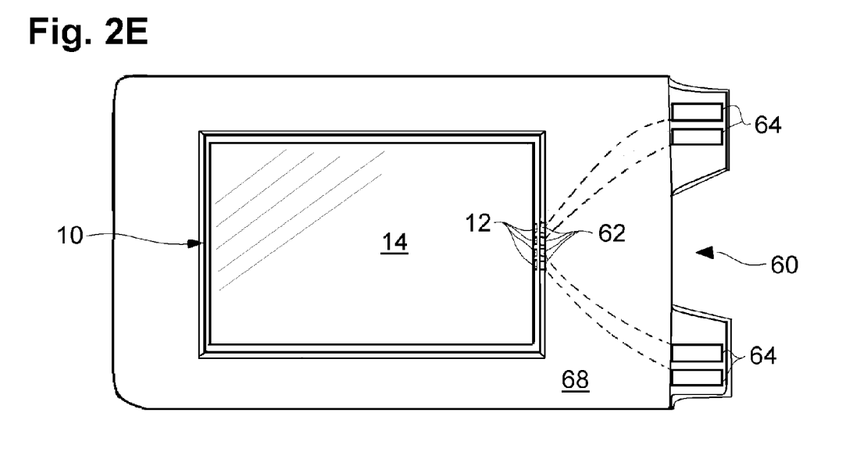

Referring now to FIG. 2E, a battery system may comprise an adaptor 60 and a universal battery 10 coupled to the adaptor. As illustrated in FIG. 2E, the adaptor 60 comprises a first set of contacts 62 located on a wall of an indentation or recess (not shown, but similar to that described above with respect to FIG. 2). The first set of contacts 62 may electrically couple to the battery's contacts 12 as described above with reference to FIGS. 2 and 2A. Additionally, one or more projections of the adaptor 60 may each comprise one or more second contacts 64 (two pairs on each of two projections shown in FIG. 2E) located on a portion of an end of the adaptor that correspond to one or more contacts of a different portable electronic device (in this case, a different mobile telephone). As illustrated in FIG. 2E, and without limiting the disclosure by showing details, each of the first set of contacts 62 may be coupled to one or more of the second contacts 64 (depicted as dotted lines). Once again, the adaptor 60 has a different shape compared to the adaptors 20, 30, 40 and 50, since the adaptor 60 may be configured to be used in yet a different brand or type of mobile telephone. The adaptor 60 further may comprise a latch mechanism (not shown) of the adaptor to securely couple the adaptor to a portion of the mobile telephone (not shown) adapted to receive a corresponding dedicated battery having the same shape as the adaptor 60. However (as described above with respect to adaptors 20, 30, 40 and 50), with the adaptor 60 available and the universal battery 10 available, the battery system of FIG. 2E may replace the dedicated battery of the corresponding mobile telephone. In operation, a user of such a dedicated battery that had become spent after multiple recharges would simply purchase the universal battery 10 along with the adaptor 60, alone or as part of a kit (as described below), whereupon the adaptor 60 retrofits into the mobile phone's battery space and receives the universal battery 10. If purchased as part of a kit (as described below), then the battery system FIG. 2E presents the significant advantages of retailer and consumer savings and convenience described in detail below. Whether purchased as part of a kit or alone, the battery system FIG. 2E presents the further advantage of enabling the economic and simple replacement of the battery 10 of the battery system FIG. 2E itself, once the universal battery 10 becomes spent after multiple recharges. Rather than needing to search out and purchase the dedicated battery of this mobile telephone, for example, or even the battery replacement kit described below, a user may simply purchase another universal battery 10 and insert it into the retained adaptor 60, which, in turn, retrofits into the mobile phone's battery space. Again, in one aspect, a portion of a surface of the adaptor 60 would be substantially adjacent to a portion of a surface of the outer casing 14 of the battery 10 when the battery was installed into the adaptor's indentation (not shown, but similar to FIGS. 2 and 2A, see description above).

Figure 2F:
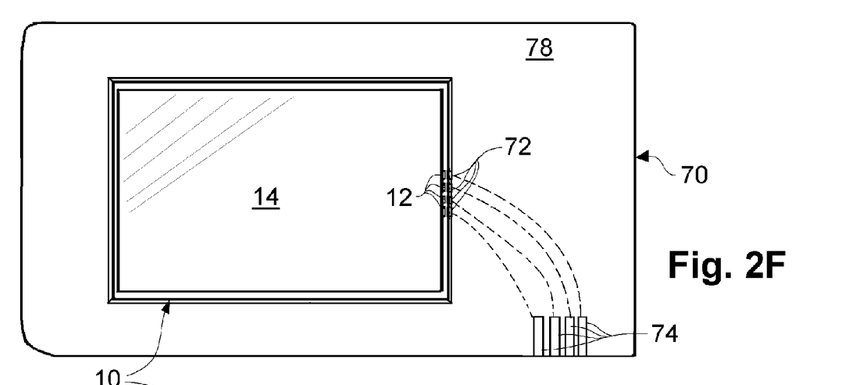

In another aspect with reference to FIG. 2F, a battery system may comprise an adaptor 70 and a universal battery 10 coupled to the adaptor. As illustrated in FIG. 2F, the adaptor 70 comprises a first set of contacts 72 located on a wall of an indentation or recess (not shown, but similar to that described above with respect to FIG. 2). The first set of contacts 72 may electrically couple to the battery's contacts 12 as described above with reference to FIGS. 2 and 2A. Additionally, one or more portions of the adaptor 70 may each comprise one or more second contacts 74 (four shown in FIG. 2F) located on a portion of a side of the adaptor that correspond to one or more contacts of a different portable electronic device (in this case, a different mobile telephone). As illustrated in FIG. 2F, and without limiting the disclosure by showing details, each of the first set of contacts 72 may be coupled to one or more of the second contacts 74 (depicted as dotted lines). Once again, the adaptor 70 has a different shape compared to the adaptors 20, 30, 40, 50 and 60, since the adaptor 70 may be configured to be used in yet a different brand or type of mobile telephone. The adaptor 70 may further comprise a latch mechanism (not shown) of the adaptor to securely couple the adaptor to a portion of the mobile telephone (not shown) adapted to receive a corresponding dedicated battery having the same shape as the adaptor 70. However (as described above with respect to adaptors 20, 30, 40, 50 and 60), with the adaptor 70 available and the universal battery 10 available, the battery system of FIG. 2F may replace the dedicated battery of the corresponding mobile telephone. In operation, a user of such a dedicated battery that had become spent after multiple recharges would simply purchase the universal battery 10 along with the adaptor 70, alone or as part of a kit (as described below), whereupon the adaptor 70 retrofits into the mobile phone's battery space and receives the universal battery 10. If purchased as part of a kit (as described below), then the battery system FIG. 2F presents the significant advantages of retailer and consumer savings and convenience described in detail below. Whether purchased as part of a kit or alone, the battery system FIG. 2F presents the further advantage of enabling the economic and simple replacement of the battery 10 of the battery system FIG. 2F itself, once the universal battery 10 becomes spent after multiple recharges. Rather than needing to search out and purchase the dedicated battery of this mobile telephone, for example, or even the battery replacement kit described below, a user may simply purchase another universal battery 10 and insert it into the retained adaptor 70, which, in turn, retrofits into the mobile phone's battery space. Again, in one aspect, a portion of a surface of the adaptor 70 would be substantially adjacent to a portion of a surface of the outer casing 14 of the battery 10 when the battery was installed into the adaptor's indentation (not shown, but similar to FIGS. 2 and 2A, see description above).

Figure 2G:
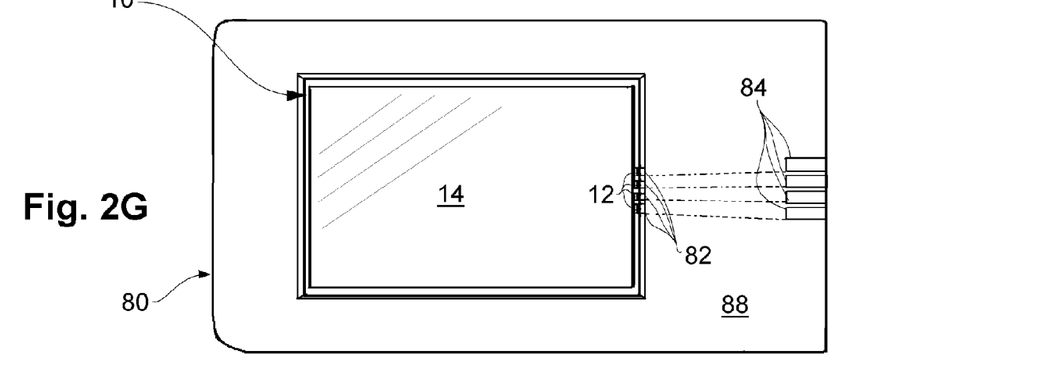

In yet a further aspect, with reference to FIG. 2G, a battery system may comprise an adaptor 80 and a universal battery 10 coupled to the adaptor. As illustrated in FIG. 2G, the adaptor 80 comprises a first set of contacts 82 located on a wall of an indentation or recess (not shown, but similar to that described above with respect to FIG. 2). The first set of contacts 82 may electrically couple to the battery's contacts 12 as described above with reference to FIGS. 2 and 2A. Additionally, one or more portions of the adaptor 80 may each comprise one or more second contacts 84 (four shown in FIG. 2G) located on a portion of an end of the adaptor that correspond to one or more contacts of a different type of portable electronic device (in this case, a different type of mobile telephone). As illustrated in FIG. 2G, and without limiting the disclosure by showing details, each of the first set of contacts 82 may be coupled to one or more of the second contacts 84 (depicted as dotted lines). Once again, the adaptor 80 has a different shape compared to the adaptors 20, 30, 40, 50, 60 and 70, since the adaptor 80 may be configured to be used in yet a different brand or type of mobile telephone. The adaptor 80 may further comprise a latch mechanism (not shown) of the adaptor to securely couple the adaptor to a portion of the mobile telephone (not shown) adapted to receive a corresponding dedicated battery having the same shape as the adaptor 80. However (as described above with respect to adaptors 20, 30, 40, 50, 60 and 70), with the adaptor 80 available and the universal battery 10 available, the battery system of FIG. 2G may replace the dedicated battery of this mobile telephone. In operation, a user of such a dedicated battery that had become spent after multiple recharges would simply purchase the universal battery 10 along with the adaptor 80, alone or as part of a kit (as described below), whereupon the adaptor 80 retrofits into the mobile phone's battery space and receives the universal battery 10. If purchased as part of a kit (as described below), then the battery system FIG. 2G presents the significant advantages of retailer and consumer savings and convenience described in detail below. Whether purchased as part of a kit or alone, the battery system FIG. 2G presents the further advantage of enabling the economic and simple replacement of the battery of the battery system FIG. 2G itself, once the universal battery 10 becomes spent after multiple recharges. Rather than needing to search out and purchase the dedicated battery of this mobile telephone, for example, or even the battery replacement kit described below, a user may simply purchase another universal battery 10 and insert it into the retained adaptor 80, which, in turn, retrofits into the mobile phone's battery space. Again, in one aspect, a portion of a surface of the adaptor 80 would be substantially adjacent to a portion of a surface of the outer casing 14 of the battery 10 when the battery was installed into the adaptor's indentation (not shown, but similar to FIGS. 2 and 2A, see description above).

Figure 3:
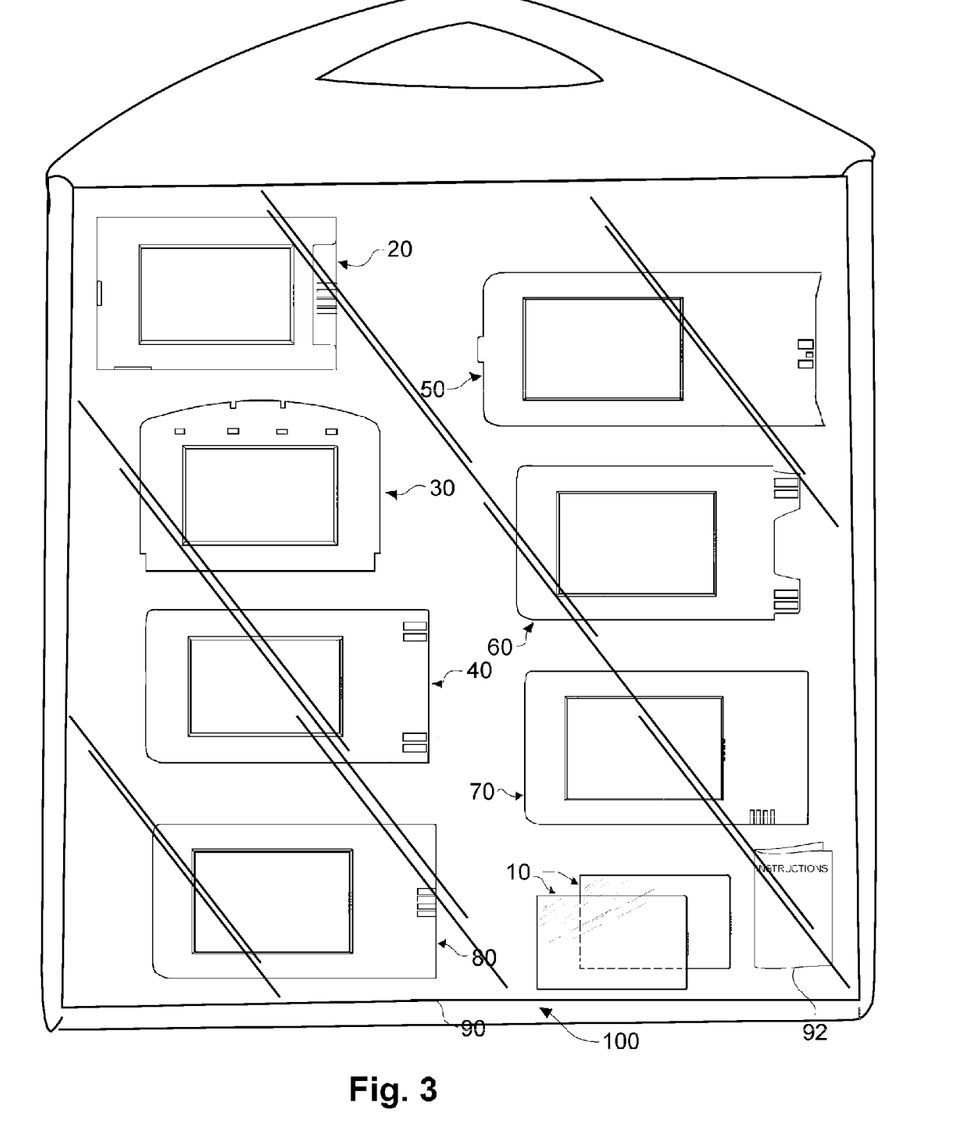
FIG. 3 is a front perspective view of a kit comprising a universal battery and a multiplicity of adaptors configured to receive one or more of the universal batteries located in a package suitable for sale to consumers.

In another embodiment as illustrated in FIG. 3, a kit 100 may comprise a universal battery 10 and a multiplicity of adaptors, such as adaptors 20, 30, 40, 50, 60, 70 and 80, configured to receive one or more of the universal batteries 10 located in a package 90 suitable for sale to consumers. In one aspect, the package 90 may comprise a see-through package and the like as is understood in the art so that a consumer may readily see whether the specific kit 100 would comprise one or more of the battery systems 20-80 the consumer may desire. The see-through package may comprise a substantially transparent or translucent thermoplastic as is known in the art or may be developed in the future of packaging materials. Further, the package may comprise a cardboard or paper backing such as found in blister packaging. Naturally, the kit 100 may comprise a smaller package or a larger package as desired. In an aspect, the kit 100 may comprise a variety of battery systems of a specific manufacturer (such as only NOKIA® or only MOTOROLA®), so that a consumer may select the kit based on the consumer's desire for a specific manufacturer's portable electronic product. From a retailer's perspective, advantageously, the retailer would no longer be required to stock a multiplicity of batteries or battery systems, thereby reducing valuable shelf space needed to merchandise and service the electronic portable devices.

In operation, in a first step S1, one or more adaptors (such as adaptors 20-80) may be arranged or selected in a package 90. Additionally, in a second step S2, one or more universal batteries 10 may also be arranged or selected in the package 90. In a further step S3, one or more instructional materials 92 my also be inserted in the package 90. Subsequently, in a further step S4, the package 90 may be sealed. Sealing may be accomplished adhesively, ultrasonically, thermally or by other processes as are understood in the art depending on the nature of the materials forming the package. In a further step S5, one or more kits 100 may be packaged for distribution and distributed to one or more wholesale outlets. Further, in a step S6, one or more wholesalers may distribute one or more kits 100 to one or more retailers. Advantageously, wholesalers would require less inventory control, because a multiplicity of battery systems would be consolidated within each kit 100 offered for sale. Moreover, retailers would require less inventory and less display space. In a further step S7, one or more retailers may display one or more kits 100 and/or one or more universal batteries 10 to be offered for sale to consumers. In yet a further step S8, consumers may select one or more kits 100 and/or universal batteries 10 associated with the kits. Thus, consumers would be able to readily obtain the appropriate adaptors suitable for their portable electronic devices and the universal batteries associated with the adaptors without having to be subjected to a tedious and time-consuming search process. While greatest advantage for this merchandising concept may ensue in a normal distribution chain from manufacturers to wholesalers and then to retailers and finally to consumers, naturally other distribution channels may also be used such as internet selling.

Figure 4A:
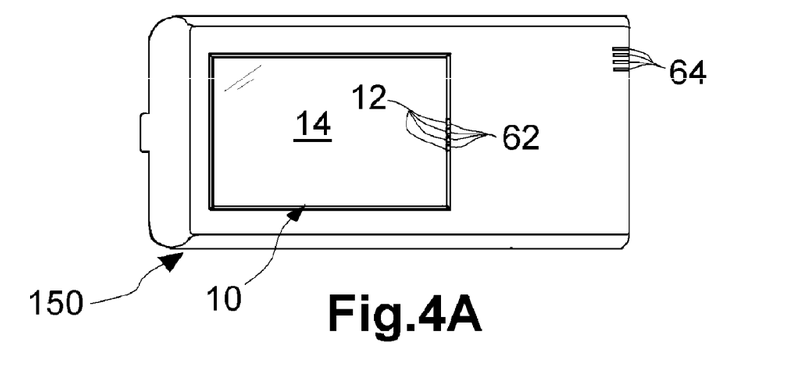
FIG. 4A depicts a front perspective view of a battery system comprising a universal battery and an embodiment of a digital camera adaptor according to the invention.
Figure 4B:
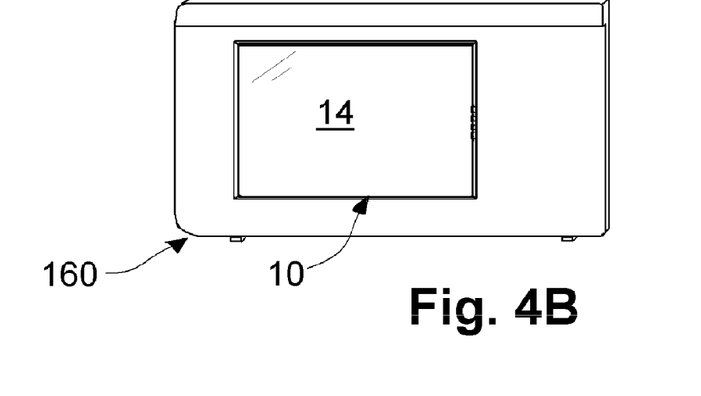
FIG. 4B depicts a front perspective view of a battery system comprising a universal battery and an embodiment of a laptop battery adaptor according to the invention.
Figure 4C:
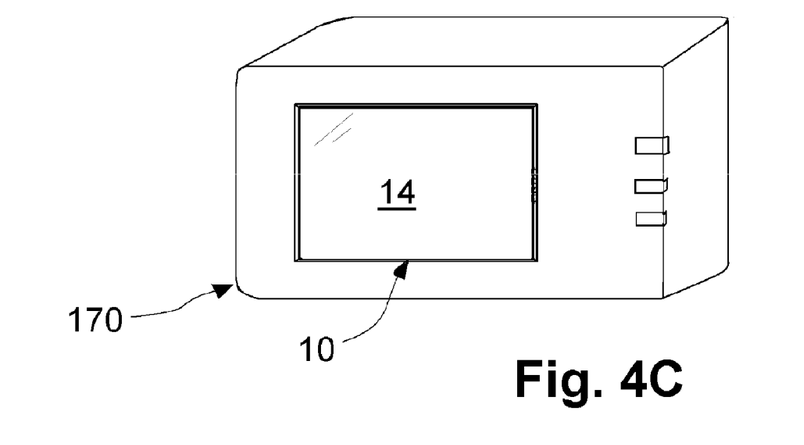
FIG. 4C depicts a front perspective view of a battery system comprising a universal battery and an embodiment of a camcorder adaptor according to the invention.

Turning now to FIGS. 4A, 4B and 4C, various different kinds of universal battery packs are illustrated for portable electronic devices other than mobile phones. Such battery packs track the dedicated battery packs of portable electronic devices available in the current marketplace. Since these universal battery packs have similar features to the improved mobile phone adaptors described herein (see above), including the feature of delivering significant retailer and consumer advantages by being packaged in kits as described above, these FIGS. 4A, 4B, 4C will not be described in any detail. However, as may be seen with reference to FIG. 4A, an embodiment of an adaptor housing for the universal battery 10, may be configured as a digital camera adaptor 150. Moreover, according to FIG. 4B a battery system may comprise a universal battery 10 and a laptop battery adaptor 160 such as a MACBOOK PRO® laptop battery. And in yet another example, FIG. 4C depicts a front perspective view of a battery system comprising a universal battery 10 and an embodiment of a camcorder adaptor 170.

While the invention has been particularly shown and described with reference to preferred embodiments thereof, it will be understood by those skilled in the art that the foregoing and other changes in form and details may be made therein without departing from the spirit and scope of the invention. The scope of the present invention is not intended to be limited by the specific examples set out herein.

What is claimed is:

1. A battery system comprising, in combination:

a first adaptor including a first adaptor recess having one or more walls and a base, said first adaptor recess located in a portion of said first adaptor;

wherein said first adaptor has a geometric shape corresponding to the geometric shape of a first dedicated battery of a first portable electronic device;

wherein, upon removal of said first dedicated battery from said first portable electronic device, said first adaptor is configured to be removably received by said first electronic portable device;

a universal battery removably receivable into said first adaptor recess, said universal battery including one or more battery contacts and said universal battery sized to a depth substantially equivalent to a depth of said one or more walls of said first adaptor recess, wherein a portion of a surface of said universal battery is substantially adjacent to a portion of a surface of said first adaptor when said universal battery engages said first adaptor recess;

wherein at least one of said walls of said first adaptor recess is configured with one or more first electrical contacts corresponding to said one or more battery contacts of said universal battery;

wherein a portion of said first adaptor has one or more second electrical contacts corresponding to one or more device electrical contacts of said first portable electronic device;

wherein said one or more first adaptor electrical contacts is in communication with one or more of said second adaptor electronic contacts;

wherein said first adaptor, in cooperation with said universal battery received into said first adaptor recess, is operable to power said first electronic portable device when said first adaptor is received by said first electronic portable device;

wherein said battery system is adapted to replace said first dedicated battery associated with said first portable electronic device;

a second adaptor including a second adaptor recess having one or more walls and a base, said second adaptor recess located in a portion of said second adaptor, said second adaptor recess having a depth substantially equivalent to the depth of said universal battery, said second adaptor recess configured to removably receive said universal battery, and second adaptor having a geometric shape corresponding to the geometric shape of a second dedicated battery of a second portable electronic device;

wherein, upon removal of said second dedicated battery from said second portable electronic device, said second adaptor is configured to be removably received by said second electronic portable device;

wherein a portion of a surface of said universal battery is substantially adjacent to a portion of a surface of said second adaptor when said universal battery engages said second adaptor recess;

wherein at least one of said walls of said second adaptor recess is configured with one or more third electrical contacts corresponding to said one or more battery contacts of said universal battery;

wherein a portion of said second adaptor has one or more fourth adaptor electrical contacts corresponding to one or more device electrical contacts of said second portable electronic device;

wherein said one or more third adaptor electrical contacts of said second adaptor is in communication with one or more of said fourth adaptor electronic contacts of said second adaptor;

wherein said second adaptor, in cooperation with said universal battery received into said second adaptor recess, is operable to power said second electronic portable device when said second adaptor is received by said second electronic portable device; and wherein said battery system is adapted to replace said second dedicated battery associated with said second portable electronic device.

2. The system of claim 1, wherein an exterior surface of said first adaptor, when received by said first electronic portable device, forms a portion of the exterior surface of said first electronic portable device.

3. The system of claim 1, further comprising at least one latch mechanism located on a portion of said first adaptor.

4. The system of claim 1 wherein said universal battery comprises at least one of the following: a lithium-ion battery and a lithium polymer battery.

5. The adaptor kit of claim 1, wherein said first adaptor, said second adaptor, and said battery are located in a package suitable for displaying said first adaptor, said second adaptor, and said battery.

6. The system of claim 1, wherein said universal battery comprises a single cell.

7. The system of claim 1, wherein said universal battery comprises multiple cells.

8. An adaptor kit configured for use with multiple portable electronic devices, comprising in combination:

multiple adaptors, each of said multiple adaptors having a recess located in a portion of each of said multiple adaptors;

said recess having one or more walls and a base, said one or more walls sized to a depth to selectively receive a universal battery, wherein a portion of a surface of said universal battery is substantially adjacent to a portion of a surface of one of said multiple adaptors when said universal battery engages said recess;

at least one of said walls including one or more first electrical contacts corresponding to one or more battery contacts of said universal battery;

a portion of each of said multiple adaptors having one or more second electrical contacts corresponding to one or more electrical contacts of a portable electronic device, wherein said electronic portable device is powered when said universal battery is received in said recess;

said one or more first electrical contacts in communication with one or more of said second electrical contacts, wherein each one of said multiple adaptors is adapted to replace a dedicated battery system associated with one of said multiple portable electronic devices; and said multiple adaptors located in a package suitable for displaying said multiple adaptors.

9. The kit of claim 8 wherein said one or more second adaptor electrical contacts are configured to communicate with one or more electrical contacts of a PC board of one of said multiple portable electronic devices.

10. The kit of claim 8 further comprising one or more universal batteries adapted to be received by said recess.

11. The kit of claim 8 further comprising one or more instructions.

12. The kit of claim 8, wherein said package comprises a see-through plastic to permit facile viewing of the contents of said package.

13. The kit of claim 8, wherein said battery comprises a single cell.

14. The kit of claim 8, wherein said battery comprises multiple cells.

15. The adaptor kit of claim 8, wherein an exterior surface of at least one of said multiple adaptors, when received by one of said multiple electronic portable devices, forms a portion of the exterior surface of one of said multiple electronic portable devices.

* * * * *